Dec. 7, 1943.                E. W. FULLER                2,336,007
                    WINDSHIELD WIPER MECHANISM
                Filed April 2, 1941          3 Sheets-Sheet 1
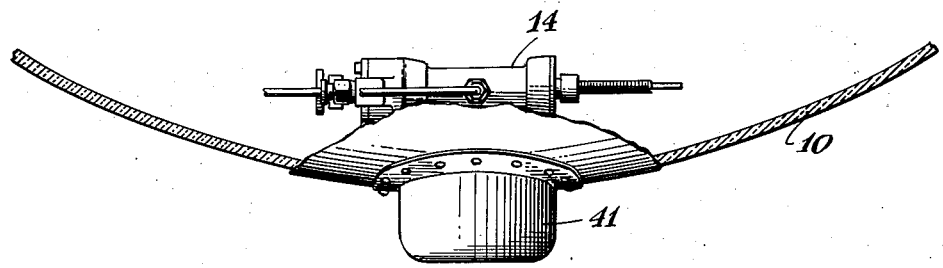
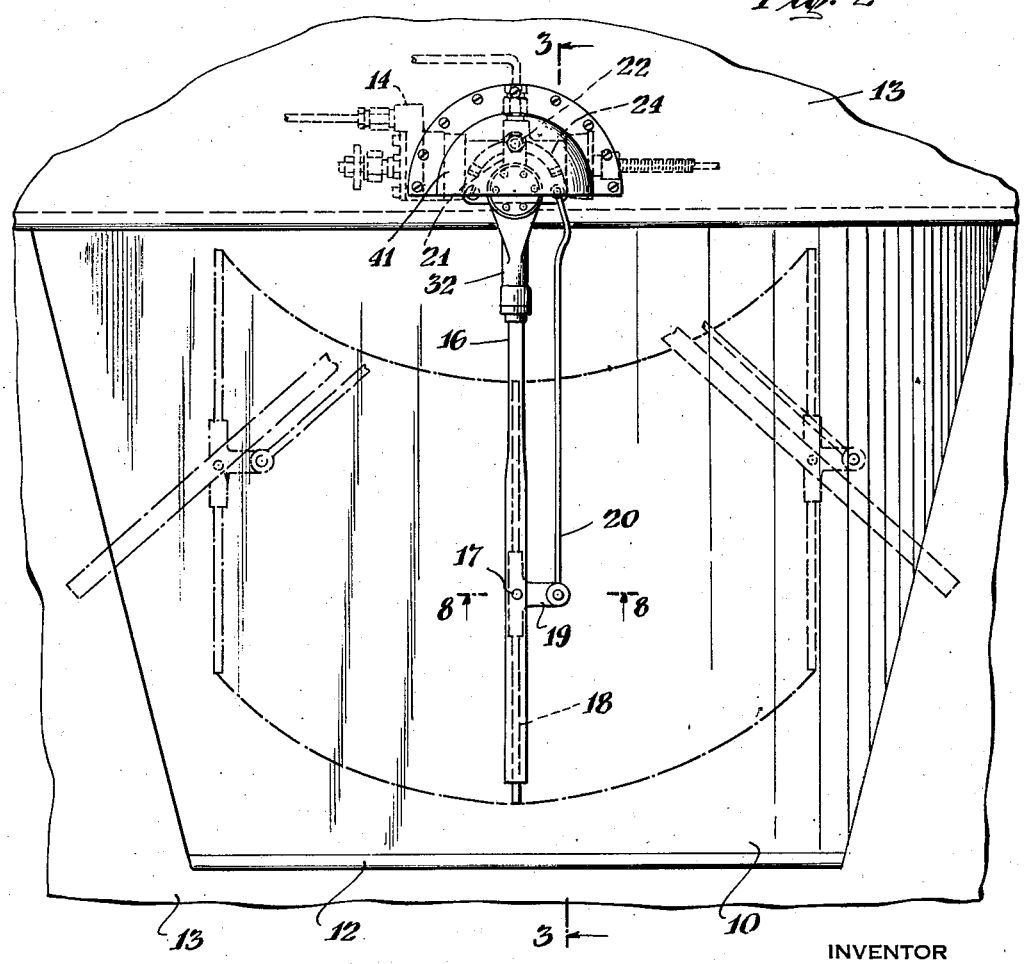
INVENTOR
Ernest W. Fuller
BY
ATTORNEYS

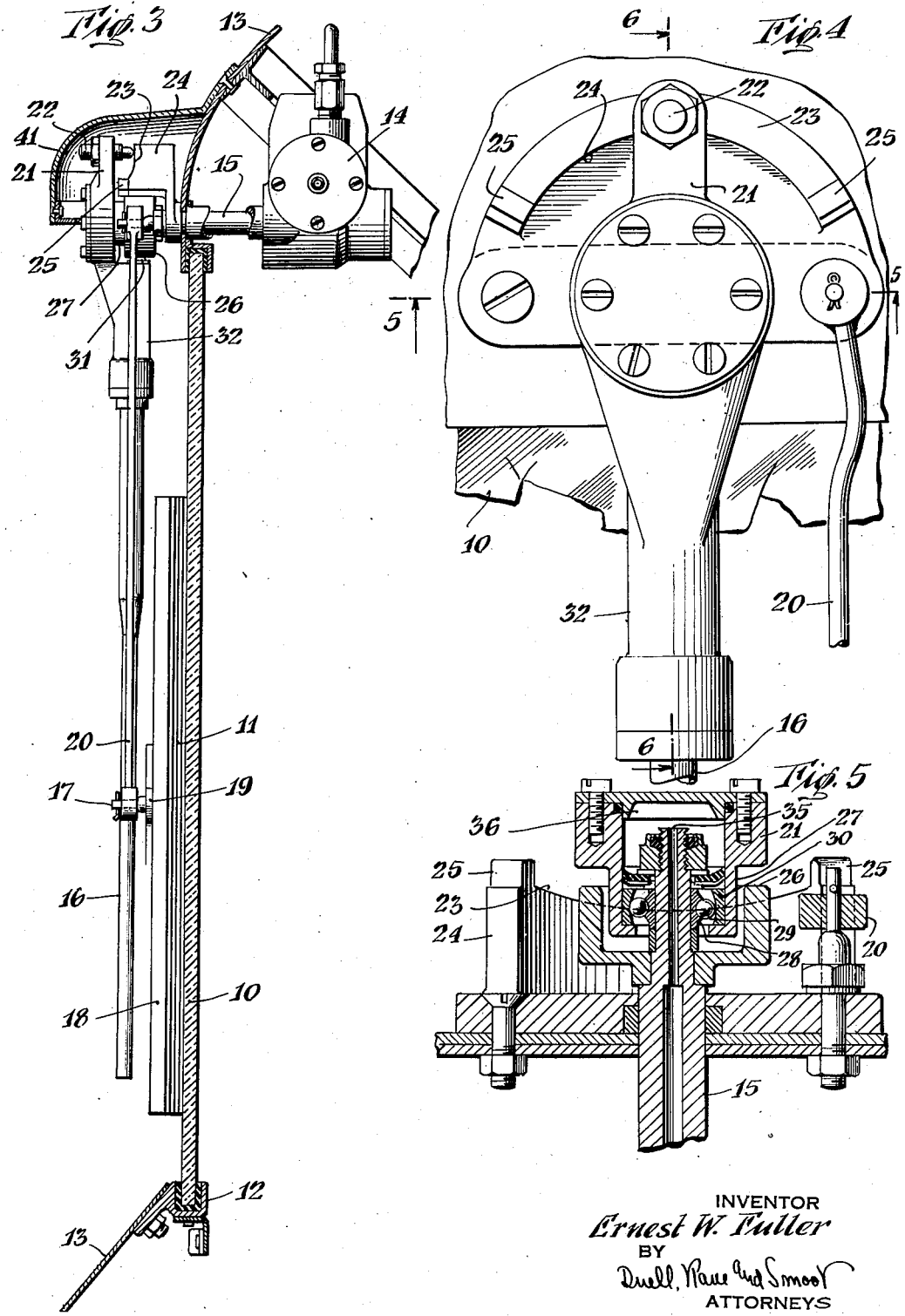

Dec. 7, 1943. E. W. FULLER 2,336,007
WINDSHIELD WIPER MECHANISM
Filed April 2, 1941 3 Sheets-Sheet 3
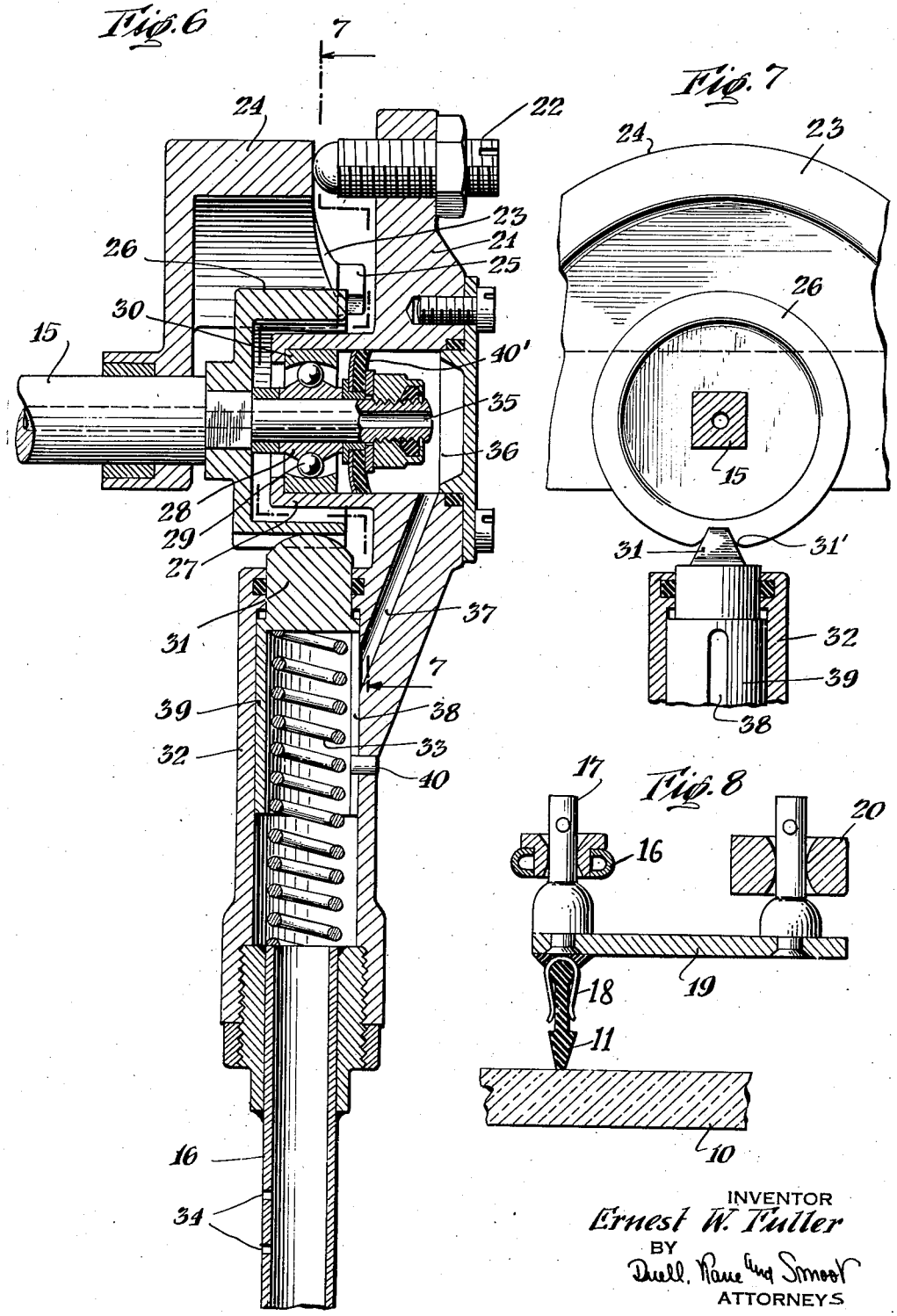
INVENTOR
Ernest W. Fuller
BY
Duell, Kane and Smoot
ATTORNEYS Patented Dec. 7, 1943

2,336,007

UNITED STATES PATENT OFFICE 2,336,007

WINDSHIELD WIPER MECHANISM

Ernest W. Fuller, Shaker Heights, Ohio, assignor to The Acrotorque Company, Cleveland, Ohio, a corporation of Connecticut Application April 2, 1941, Serial No. 386,400

4 Claims. (Cl. 15—253)

This invention relates to a structurally and functionally improved windshield wiper or similar mechanism capable of use in numerous different associations but primarily intended for employment in connection with aircraft and especially airplanes.

It is an object of the invention to provide a mechanism of this character, by means of which a curved surface or panel, such as a windshield, may be maintained in clean and transparent condition.

A further object is that of providing such a mechanism by means of which, a wiping or cleaning element will remain in efficient and continuous contact with the surface to be cleaned and throughout a predetermined and desired area of such surface, despite the curvature which may be present in the latter.

Another object is that of furnishing a cleaning mechanism, by means of which alcohol or other suitable fluid may be discharged in continuous proximity to a curved surface to be cleaned and in an efficient manner so that, accumulation of ice or similar material will be effectively impregnated or coated with such fluid.

Another, and in certain respects, quite independent object of the invention is that of furnishing a cleaning mechanism which will be self-freeing, even though the wiping element, such as a squeegee, might, at the time when the mechanism is set in operation, be initially frozen to the surface to be cleaned. Moreover, by means of this mechanism, the blade or wiping element will not alone be freed but will also serve, in effect, to force or pry any accumulations of ice or similar encrustations from the surface to be cleaned, while constantly giving an increasing field of vision through such surface.

Another object is that of providing a mechanism embodying any or all of the foregoing advantages, which mechanism will include relatively few parts, each individually simple and rugged in construction and operating without manual supervision over long periods of time with freedom from all difficulties.

With these and other objects in mind, reference is had to the attached sheets of drawings illustrating one practical embodiment of the invention and in which:

Fig. 1 is a sectional plan view taken through the windshield of a vehicle and showing the wiper mechanism applied thereto;

Fig. 2 is a front view of the apparatus as illustrated in Fig. 1;

Fig. 3 is an enlarged sectional side view taken along the lines 3—3 and in the direction of the arrows as indicated in Fig. 2;

Fig. 4 is a fragmentary and still further enlarged view showing in elevation certain details of the mechanism as illustrated in the preceding views;

Fig. 5 is a transverse sectional view taken along the lines 5—5 and in the direction of the arrows as indicated in Fig. 4;

Fig. 6 is a sectional view taken along the lines 6—6 and in the direction of the arrows as also indicated in Fig. 4;

Fig. 7 is a sectional view taken along the lines 7—7 and in the direction of the arrows as indicated in Fig. 6; and Fig. 8 is a transverse sectional view taken along the lines 8—8 and in the direction of the arrows as indicated in Fig. 2.

Referring primarily to Figs. 1, 2 and 3, it will be seen that the reference numeral 10 indicates the windshield or other surface which is to be cleaned, preferably by means of a suitable squeegee or rubber blade 11. The panel 10 is supported as indicated at 12 and beyond these portions the skin or body 13 of the vehicle or ship may extend.

It will be assumed, for the purposes of this description, that the panel 10 actually is the windshield of an airplane and that immediately to the rear of the same, the pilot's compartment or cockpit is located. It is obvious that the invention might be applied to other panels or windows of an aircraft and in fact, might be utilized in conjunction with vehicles not necessarily falling into the aircraft classification. In any event, one of the major functions achieved by means of the present invention, is that of cleaning a curved panel or surface, and with this thought in mind the panel, as illustrated in Fig. 1, has been shown as having a curved configuration.

In order to clean the surface, it is therefore apparent that there must be imparted to the blade 11 or its equivalent, a reciprocating motion—which will preferably be through an arcuate path—and at the same time, the blade must constantly be maintained in contact with the surface of the panel. In order words, in addition to the aforementioned reciprocating action or sidewise movement, the blade or other element must have imparted to it a movement in directions substantially transverse to said sidewise movement.

The degree of this latter movement, will vary or be modified according to the configuration or curvature of the panel. The latter, as illustrated, is the true surface of a cylinder. Obviously however, such surface might be a section of a curved surface which would not be truly cylindrical and which might be a section of a frustum of a cone.

As illustrated, the blade 11 is reciprocated through an arc and across the base of the panel and with an assembly as shown, such blade should always remain parallel to the axis about which the windshield glass cylinder is generated. Obviously, various other motions could be imparted to the wiping blade. However, in certain respects, it is preferred that just precisely this movement of the parts occur in that it has been found that such a type of motion on the part of a flat edged blade results in a continuous contact with, and a most efficient cleaning of the panel. Thus, to impart this movement or drive to the blade, it will be observed that a motor 14 is provided inside the skin or body 13 of the ship and this motor serves to oscillate a shaft 15.

It is, of course, apparent that the motor need not necessarily be positioned adjacent the panel 10 but could be remotely located therefrom with any suitable intermediate drive being provided between the shaft 15 and such motor. Thus, the shaft has imparted to it the desired motion and this shaft extends through suitable packing to a point exterior of the skin 13 and adjacent the panel 10.

Connected to shaft 15 in a manner hereinafter described, is an operating arm 16 which is preferably in the form of a tube. Pivotally secured to the latter as at 17 is the backing strip 18 of the blade 11. An arm 19 is fixedly secured to this backing strip and extends at right angles therefrom. This arm is connected by a link 20 to a point adjacent—and in the same horizontal plane with—the axis of rotation of shaft 15. In this manner, a pantograph or parallel link structure is provided such, that the longitudinal axis of blade 11 will, throughout its travel, be substantially parallel to all of its previous positions. Consequently, as indicated in Fig. 2, the field traversed by the blade will present straight side-edge portions connected by curved upper and lower edge portions, which latter are separated by the length of the blade and neither of which, have as their centers, the axis of shaft 15.

Now with a view to providing means whereby the blade may have imparted to it, a movement such that it will remain in contact with the face of the panel or glass 10 throughout its entire movement thereover, it will be noted that the connection between the arm 16 and the operating shaft 15 comprises—as especially shown in Figs. 5, 6 and 7—a member 21 projecting beyond the axis of shaft 15. This member is in effect an integral part of the arm and mounts a follower 22 traversing the edge 23 of a cam 24. The latter is preferably fixed against movement with respect to the skin or body of the vehicle. The end portions of the cam surface 23 are defined by stops 25 which limit the movement of the follower and consequently the movement of arm 16. Thus, the arm 16 may be coupled by some form of universal joint such as a self-aligning type of ball bearing 29. The inner race 28 of the ball bearing 29 is affixed to shaft 15. The outer element 30 is fixed within the hub 27. As will be observed, the bearing being of the self-aligning type may, for example, have a latitude of 10 degrees of swinging movement. Thus, it is apparent that a structure is furnished such that the arm 16—while moving fixedly with the shaft 15 as the latter oscillates—may also have a swinging movement with respect to such arm in a plane parallel to the axis of shaft 15. As the latter oscillates, it will be apparent that the follower 22 will traverse the cam surface 23. Consequently as shaft 15 oscillates, arm 16 will be given a compound rocking movement. The first part of such movement will be the obvious one of arm 16 oscillating or swinging in synchronism with the shaft 15. The second part of the movement which is superimposed on the first part, will be that of additionally causing arm 16 to swing in a direction approximately parallel to the axis of shaft 15. The cam 23 being generated to embody a configuration corresponding precisely to the configuration of the panel 10 along the path of hinge 17, it is, of course, obvious that by this construction the blade will at all times remain in contact with the surface to be cleaned.

There is now to be considered a further and important aspect of the invention which contemplates a structure such, that without damage to the parts, the blade may be caused to traverse and clear an area of a panel or windshield 10 even assuming that such blade is initially frozen to the surface of the panel. One structure for achieving this result is to be found, in providing a drive bushing 26 which is affixed to shaft 15. The member 21 is provided with a hub 27 fitting into this bushing. A clutch coupling of an automatic type is provided between the arm 16 and the shaft 15 and may include, as shown, a spring pressed pawl 31 mounted for sliding movement in a tubular extension 32 which forms a continuation of the arm and a part of member 21. This pawl may engage within a notch 31' having inclined edges and formed in the outer face of bushing 26. Normally, the pressure of spring 33 is adequate to maintain the pawl or tongue 31 effectively in positive contact with the bushing and so that, these two elements will move in unison. However, should the resistance to movement on the part of arm 16 be greater than the torque developed by shaft 15, it is apparent that the pawl will ride out of the notch 31'. Consequently, assuming that the blade 11 is frozen to the surface to be cleaned, it is apparent that as shaft 15 begins to operate, there will be an attempt through the clutching mechanism to cause movement on the part of arm 16. The pawl thereupon will ride out of the notch 31' and relative movement will occur between the arm 16 and the parts attached thereto and the shaft 15. During such movement, the end of the pawl 31 will merely ride over the surface of the bushing 26 and the driving mechanism will be free to continue its cycle. Upon the return swing or turning of the shaft 15, the pawl will again ride into the notch and there will be an attempt of the shaft to again move the arm in an opposite direction. This will continue until the blade actually frees itself from the surface of the panel 10 and begins to have at least a small degree of movement over the same. Each time the shaft 15 moves through its cycle of operation, the clutch parts will engage and disengage twice. Thus, the arm 16 and the blade associated therewith will in effect be caused to exert a ram or hammering action, such that the blade will be brough into forcible contact with the edges of the material or ice to each side of the area which is being traversed by the blade. It will only be when the resistance to movement of the arm increases to a great extent—such as when it encounters a solid body of ice or other foreign matter—that the pawl will de-clutch. Thus, an obstruction of ice on the panel, through it may halt the motion of the wiping blades, will not prevent the continued oscillation of the shaft 15. The latter will, therefore, on its return swing, re-engage the pawl, moving the wiping blade in the direction of the surface already cleaned, until another obstruction on the other side of such surface is reached, in which case the described action will be repeated. Accordingly, the area which is being cleared by the blade will constantly increase. Furthermore, at no time will the arm 16 swing to a position beyond the range over which the clutch will function. The stops 25 will bear on the follower 22 to prevent such an occurrence.

Now to assist in the ramming or clearing action just described and also in order to maintain the surface free from accumulations—such as deposits of ice—it is preferred that some proper type of liquid be sprayed toward or distributed over the surface to be cleaned. Such a liquid may be alcohol and it preferably flows through the shaft 15 and through perforations 34 in the arm or tube 16 and thus, towards the surface of the panel 10 at a point immediately adjacent the wiping element or blade. In order to accomplish this result, the shaft 15 may be formed with a bore 35 which communicates with a space 36 formed in that part of the extended portion 21 which is in line with the shaft. A channel 37 extends from this space 36 through a slit 38 formed in the skirt 39 of the pawl 31. This slit may also—in cooperation with a guide pin 40—provide a track-way preventing rotation of the pawl within the extended housing portion 32. In any event, however, the alcohol will be free to flow into the interior or bore of arm 16 and thence be distributed in the direction of the windshield surface. No especially detailed method of distribution has been illustrated in the present case, in that any one of a number of different structures might be employed.

In any event, it will be understood that by means of the present invention, a fluid distributing arm is furnished such that the alcohol or its equivalent is caused to flow in immediate proximity to the panel to be cleaned, even though the latter be curved. Moreover, such distribution will preferably be adjacent to the area of contact between the panel and wiper element. This is, of course, conceding that the fluid distribution is effected in conjunction with a wiper.

As will be appreciated, fluid such as alcohol acting against the face of the panel 10, while the ramming action afore described is effected, will cause a rapid clearing of the windshield surface even under the most adverse weather conditions despite the fact that the blade may have become tightly frozen to such surface. It is preferred that a gasket 40' be provided within the hub 27 so that the alcohol or other fluid which may be employed will not flow in contact with the bearing 29 or be distributed in any manner other than through the properly defined channels. This gasket may be formed by "neoprene" or similar material which will resist deterioration by the fluid used.

Briefly reviewing the operation of the apparatus, it will be understood that the shaft 15 may be driven by any suitable source of power and which source may include a remotely or otherwise located motor. Due to the cam structure and follower 22, the wiper element will be caused to traverse and remain in contact with the surface to be cleaned even though such surface be curved. By having the cam edge 23 of proper configuration and corresponding to the configuration of the windshield or panel, virtually any degree or peculiarity of curvature may be taken into account. Consequently the blade, or other wiping element, will have imparted to it movements which will be reciprocating along the arcuate path desired. This cam and follower structure might, of course, be located at any desired point but in the interest of compactness and to prevent to a maximum extent any obscuring of vision through the panel 10, it is preferred that the same be located above the axis of shaft 15 in the manner shown. When so located it is feasible to employ a shield 41 which will protect the parts from becoming covered with accumulations of sleet, ice and snow.

As a consequence of the wiper element following precisely the curvature of the panel 10, the alcohol will be released to the atmosphere and toward this panel at points at all times equally spaced from the surface to be treated. This, of course, is important in that the slip-stream has such velocity that with a variable spacing between the panel and the source of distribution of alcohol, certain areas of the panel would receive an inadequate treatment or coating. It is obvious that proper distribution of fluid, especially where it occurs in conjunction with a ramming or hammering action, will quickly result in the parts properly operating after such operation has been initiated.

With respect to this ramming action, it will be understood that while the structure may, as herein described, include as part of the mechanism a device assuring a blade motion to conform to the windshield curvature, this ramming action would be very advantageous whether a curved windshield were involved or not. Suffice it to say that, regardless of this factor, the clutching and declutching action will cause a rapid freeing of the blade and clearing of an increasing area of the panel as the shaft 15 oscillates. Also, it has been found that the shearing effect or motion on the part of the blade obtained with the pantograph action which is included in the present apparatus as a consequence of the link structure 20, is a desirable feature in a windshield cleaning mechanism.

In conclusion, it will be appreciated, as a consequence of the foregoing structure, that among others the objects specifically aforenoted are achieved. It will likewise be apparent that numerous changes in structure and rearrangements of the parts might be resorted to without departing from the spirit of the invention as defined by the claims.

I claim:

1. A wiping mechanism for a curved surface, said mechanism including in combination a rotatably mounted shaft to be driven by a motor, a member, a coupling comprising parts providing a rocking joint secured to said member and shaft to maintain the former mounted in a manner such that it functions as a lever rockingly mounted substantially in line with said shaft and with its arms extending to both sides of the same, means for preventing rotation of said member around said shaft, one of the arms of said lever being adapted to support a wiper blade and fixedly mounted means cooperable with the other arm of said member as said shaft is rotated to constantly rock the same in a plane which includes the shaft axis and thereby continuously maintain the wiper blade in contact with the curved surface.

2. A wiping mechanism for a curved surface, said mechanism including in combination a rotatably mounted shaft to be driven by a motor, a member, a coupling comprising parts providing a rocking joint secured to said member and shaft to maintain the former mounted in a manner such that it functions as a lever rockingly mounted substantially in line with said shaft and with its arms extending to both sides of the same, means for preventing rotation of said member around said shaft, one of the arms of said lever being adapted to support a wiper blade and a fixedly mounted element providing a cam surface extending in a direction transverse to the body of said member, said surface being cooperable with the other arm of said member, as said shaft is rotated to constantly rock the same in a plane which includes the shaft axis and to continuously maintain said wiper blade in contact with said curved surface.

3. A wiping mechanism for a curved surface, said mechanism including in combination a rotatably mounted shaft to be driven by a motor, a member, a coupling comprising parts providing a rocking joint secured to said member and shaft to maintain the former mounted in a manner such that it functions as a lever rockingly mounted substantially in line with said shaft and with its arms extending to both sides of the same, means for preventing rotation of said member around said shaft, one of the arms of said lever being adapted to support a wiper blade, a fixedly mounted element presenting an outwardly extending cam surface corresponding to the curved surface with which said mechanism is to cooperate, said cam surface being arranged substantially in line with the outer end of the other arm and means mounted by said other arm and engaging and continuously movable over said cam surface whereby to rock said member in a plane which includes the shaft axis as said shaft is rotated and to thereby maintain said wiper blade in continuous contact with the curved surface.

4. A wiping mechanism for a curved surface, said mechanism including in combination a rotatably mounted shaft to be driven by a motor, a member, a coupling comprising parts providing a rocking joint secured to said member and shaft to maintain the former mounted in a manner such that it functions as a lever rockingly mounted substantially in line with said shaft and with its arms extending to both sides of the same, means for preventing rotation of said member around said shaft, one of the arms of said lever being adapted to support a wiper blade, means cooperable with the other arm of said member to rock the same in a plane which includes the shaft axis and as said shaft is rotated, said shaft being formed with a fluid passage, said member being likewise formed with a fluid distributing passage and means associated with said member and whereby fluid may flow from the shaft passage to the member passage.

ERNEST W. FULLER.